L. C. DICKENSON.
PROCESS FOR TREATING DISEASED OR DECAYED TREES.
APPLICATION FILED MAR. 5, 1912.
1,047,001.  Patented Dec. 10, 1912.
Fig 1
Fig 2
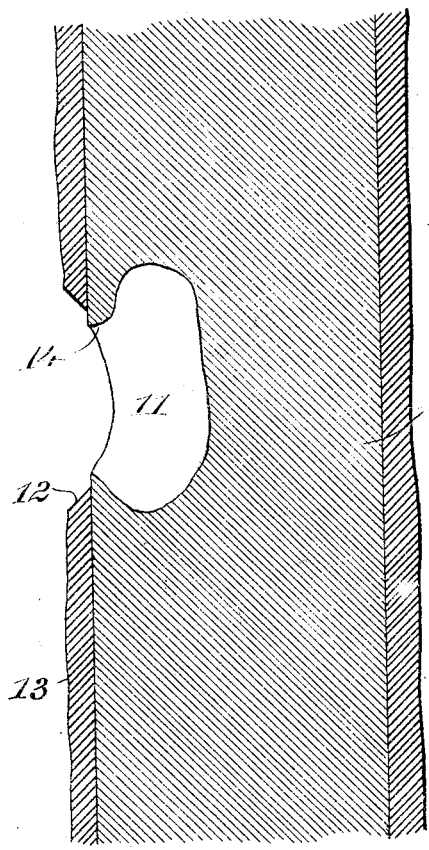
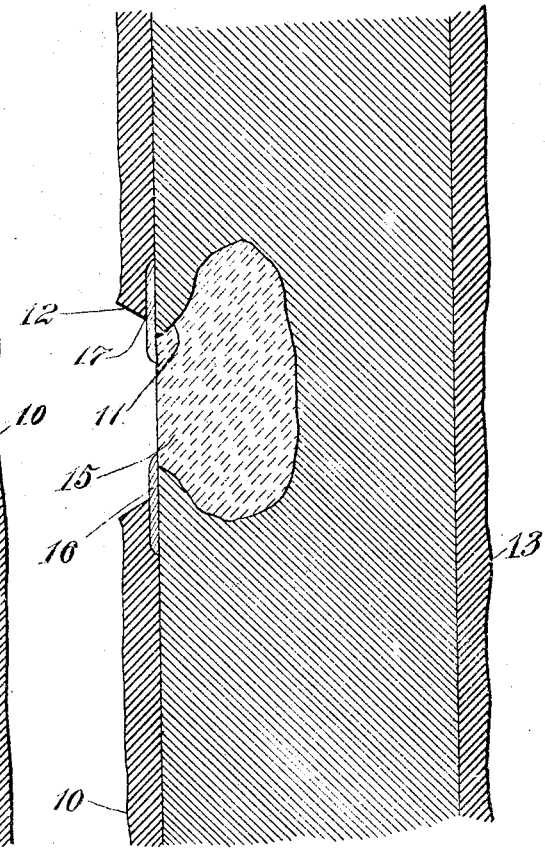
Inventor
L. C. Dickenson
By Victor J. Evans
Attorney
Witnesses
Raymond J. Gilbert

UNITED STATES PATENT OFFICE.

LOUIS C. DICKENSON, OF GRAND RAPIDS, MICHIGAN.

PROCESS FOR TREATING DISEASED OR DECAYED TREES.

1,047,001.  Specification of Letters Patent.  Patented Dec. 10, 1912.

Application filed March 5, 1912. Serial No. 681,794.

*To all whom it may concern:*

Be it known that I, LOUIS C. DICKENSON, a citizen of the United States, residing at Grand Rapids, in the county of Kent and State of Michigan, have invented new and useful Improvements in Processes for Treating Diseased or Decayed Trees, of which the following is a specification.

The invention relates to the process of treating diseased or decayed trees by means of a filling and has for an object to render the process more efficient.

In the process of treating diseased or decayed trees by cutting away the decayed matter to form a cavity, in which a filling, consisting of a suitable composition or the like is placed, the usual method is to entirely fill the cavity with a filling, the edges of the bark around the mouth of the cavity being cut at right angles to the outer surface of the bark. Therefore, when the new bark commences to grow outwardly and around the filling at the mouth of the cavity, the edges of the old bark are pressed outwardly by the new bark and in consequence thereof recesses are formed between the new bark and the edge of the old bark, the mentioned recesses being sufficiently large to harbor bacteria or other germs detrimental to the new bark. Furthermore, the old bark when pressed outward as mentioned so that the edges thereof project beyond the contour of the tree, does not present a neat and effective appearance and in order to overcome these defects I preferably bevel the edges of the old bark in such a manner that when the new bark grows around the mouth of the cavity, said cavity having been previously filled with a composition or the like, a solid joint will be formed between the new bark and the edges of the old bark, the mentioned joint being smooth and free from recesses so that bacteria or other germs cannot harbor between the new bark and old bark and thus destroy the new bark, while at the same time the mentioned joint will present a neat and effective appearance.

In order to more fully disclose the invention, reference is to be had to the accompanying drawings constituting a part of this specification, in which similar similar characters of reference denote corresponding parts in all the views, and in which—

Figure 1 is a fragmentary vertical sectional view taken through a tree, showing a cavity and the manner of beveling the edges of the bark, the cavity being open. Fig. 2 is a similar vertical sectional view showing the cavity provided with a suitable filling and the growth of new bark, a solid joint being formed between the new bark and the old bark.

Referring to the views, the numeral 10 designates the tree and the cavity therein is designated by the numeral 11. When the cavity has been cleaned and all decayed matter removed therefrom, the edges 12 of the bark 13 are beveled adjacent the mouth 14 of the cavity and the cavity is then filled with a suitable filling 15, the mentioned filling being any standard composition suitably adapted for this purpose. When the face of the filling has been properly smoothed down, the edge of the face will aline with the periphery of the body of the tree and consequently when the new bark 16 commences to grow over the face at the mouth 14, the mentioned new bark will commence at the inner beveled end of the bark 13, thus forming a tight and solid joint 17 at the point of connection of the new bark with the edges of the old bark and it will be readily seen that by beveling the edges of the old bark as mentioned to provide the solid joint 17, the elements and foreign matter will be prevented from attacking the roof of the new bark 16.

It has been found that when the new bark grows outwardly, it tends by the pressure produced to chip off the inner tip end of the beveled edge of the old bark and thus as the new bark will readily grow over the chipped off edge, a still better joint will be formed between the new and old bark, whereas, if the edges of the bark are cut at right angles to the outer surface of the bark, the outward pressure of the new bark, would force the edges of the old bark outwardly, thus presenting an ungraceful appearance, while at the same time, recesses would be formed between the edge of the old bark and the new bark, the said recess constituting a suitable harbor for various germs that lodge in niches in trees and attack the tender portions thereof.

By beveling the edges of the old bark as mentioned, when the new bark appears, the new bark will not only connect with the old bark in such a manner as to form a tight and solid joint, but the line of contour of the old bark with the line of contour of the new bark will present a neat and effective appearance.

I claim:—

1. The process of treating decayed or diseased trees, consisting in beveling the edges of the old bark, around the mouth of the cavity that is formed when the decayed matter is removed from the tree, the cavity being closed with a filling the face of which will lie adjacent to the beveled edges of the bark.

2. The herein described process of treating decayed or diseased trees, consisting in removing the decayed matter from the tree to form a cavity, inserting a filling in the cavity with the face of the filling adjacent the edge of the bark, the edge of the bark being then beveled so that the inner end of the beveled edge will form a joint with the new bark of the tree.

3. The herein described process of treating decayed and diseased trees consisting in beveling the edges of the old bark, adjacent the mouth of the cavity formed by removing the decayed matter from the tree.

4. The herein described process of treating decayed and diseased trees consisting in beveling the edges of the old bark at a spaced distance from the mouth of a cavity in the tree.

In testimony whereof I affix my signature in presence of two witnesses.

LOUIS C. DICKENSON.

Witnesses:
  FRED S. TEMPLE,
  GEORGE W. THOMPSON.